US010302424B2

(12) United States Patent
Cossairt et al.

(10) Patent No.: US 10,302,424 B2
(45) Date of Patent: May 28, 2019

(54) MOTION CONTRAST DEPTH SCANNING

(71) Applicant: Northwestern University, Evanston, IL (US)

(72) Inventors: Oliver Strider Cossairt, Evanston, IL (US); Nathan Matsuda, Chicago, IL (US)

(73) Assignee: Northwestern University, Evanston, IL (US)

(*) Notice: Subject to any disclaimer, the term of this patent is extended or adjusted under 35 U.S.C. 154(b) by 0 days.

(21) Appl. No.: 15/314,871

(22) PCT Filed: May 29, 2015

(86) PCT No.: PCT/US2015/033264
§ 371 (c)(1),
(2) Date: Nov. 29, 2016

(87) PCT Pub. No.: WO2015/184308
PCT Pub. Date: Dec. 3, 2015

(65) Prior Publication Data
US 2017/0108332 A1 Apr. 20, 2017

Related U.S. Application Data

(60) Provisional application No. 62/004,456, filed on May 29, 2014.

(51) Int. Cl.
*G01B 11/25* (2006.01)
*G06T 7/20* (2017.01)
*G06T 7/55* (2017.01)

(52) U.S. Cl.
CPC ...... *G01B 11/2518* (2013.01); *G01B 11/2513* (2013.01); *G06T 7/20* (2013.01); *G06T 7/55* (2017.01); *G06T 2207/10004* (2013.01)

(58) Field of Classification Search
CPC ............ G01B 11/2513; G01B 11/2518; G06T 2207/10004; G06T 7/20; G06T 7/0065
(Continued)

(56) References Cited

U.S. PATENT DOCUMENTS 7,365,331 B2 * 4/2008 Moulin .................... B07C 1/00
 250/341.8
7,376,261 B2 * 5/2008 Noda ....................... G01B 5/20
 250/559.22

(Continued)

OTHER PUBLICATIONS

Almarshad, Hassan, Assessing the Photosensitivity of the Compound Eye in Firefly Photuris sp.: an Electrophysiological Approach, IEEE, 2010, pp. 231-234.
(Continued)

*Primary Examiner* — Tri T Ton
(74) *Attorney, Agent, or Firm* — Bell & Manning, LLC

(57) ABSTRACT

Motion contrast depth scanning is disclosed herein. A disclosed example apparatus includes an illumination source that is to provide at least one of spatial or temporal changes to light emitted from the illumination source to a scene. The example apparatus also includes a motion contrast sensor, where pixels of the motion contrast sensor are to detect changes corresponding to the scene, and where the motion contrast sensor is to report measurements when a pixel change exceeds a threshold. The example apparatus further includes a processor to determine at least one of a reflectance, a depth, or movement of the scene based on the reported measurements by the motion contrast sensor.

23 Claims, 14 Drawing Sheets

(58) Field of Classification Search
USPC .................................................. 356/614–640
See application file for complete search history.

(56) References Cited

U.S. PATENT DOCUMENTS

| | | | |
|---|---|---|---|
| 2004/0211904 A1* | 10/2004 | Scowen | B65H 7/14 250/341.1 |
| 2008/0199051 A1* | 8/2008 | Seo | G08B 13/19602 382/107 |
| 2013/0043386 A1* | 2/2013 | Yamazaki | H01J 37/28 250/307 |
| 2016/0098590 A1* | 4/2016 | Bredno | G06K 9/00127 382/133 |

OTHER PUBLICATIONS

Bakkali, M., et al., A Prototype Node for Wireless Vision Sensor Network Applications Development, Institute of Electrical and Electronics Engineers, 5th International Symposium on I/V Communications and Mobile Network, 2010, pp. 1-4.

Duhamel, Pierre-Emile, et al., Hardware in the Loop for Optical Flow Sensing in a Robotic Bee, 2011 IEEEIRSJ International Conference on Intelligent Robots and Systems, Sep. 25-30, 2011, pp. 1099-1106.

Jeong, Ki-Hun, et al., Biologically inspired optical structures for wide field-of-view imaging and wide angle illumination, IEEE/LEOS International Conference on Optical MEMS and Nanophotonics, Aug. 17-20, 2009, pp. 57-58.

Written Opinion for PCT/US2015/033264, dated Dec. 3, 2015.

* cited by examiner (a) Non-Scanning (b) Scanning (a) Line Scan  (b) Binary SL  (c) Phase Shift  (d) Single Shot (a) 150lux   (b) 500lux   (c) 1000lux   (d) 2000lux   (e) 5000lux

MOTION CONTRAST DEPTH SCANNING

CROSS-REFERENCE TO RELATED APPLICATIONS

This patent application is a U.S. National Stage Entry of PCT/US2015/033264 filed May 29, 2015, which claims the benefit of priority to U.S. Provisional Application No. 62/004,456, filed on May 29, 2014, both of which are hereby incorporated by reference.

FIELD OF THE DISCLOSURE

This disclosure relates generally to three-dimensional scanning, and, more particularly, to motion contrast depth scanning.

BACKGROUND

Typically, structured light three-dimensional (3-D) scanning systems are widely used in applications such as industrial automation, autonomous transportation, robotic surgery and entertainment. Such systems are fundamentally constrained by limited sensor bandwidth and light source power, which may result in trade-offs between speed, resolution and/or performance in strong ambient illumination (e.g., outdoor environments). Many existing structured light techniques improve certain characteristics at the expense of others.

Figure 1:
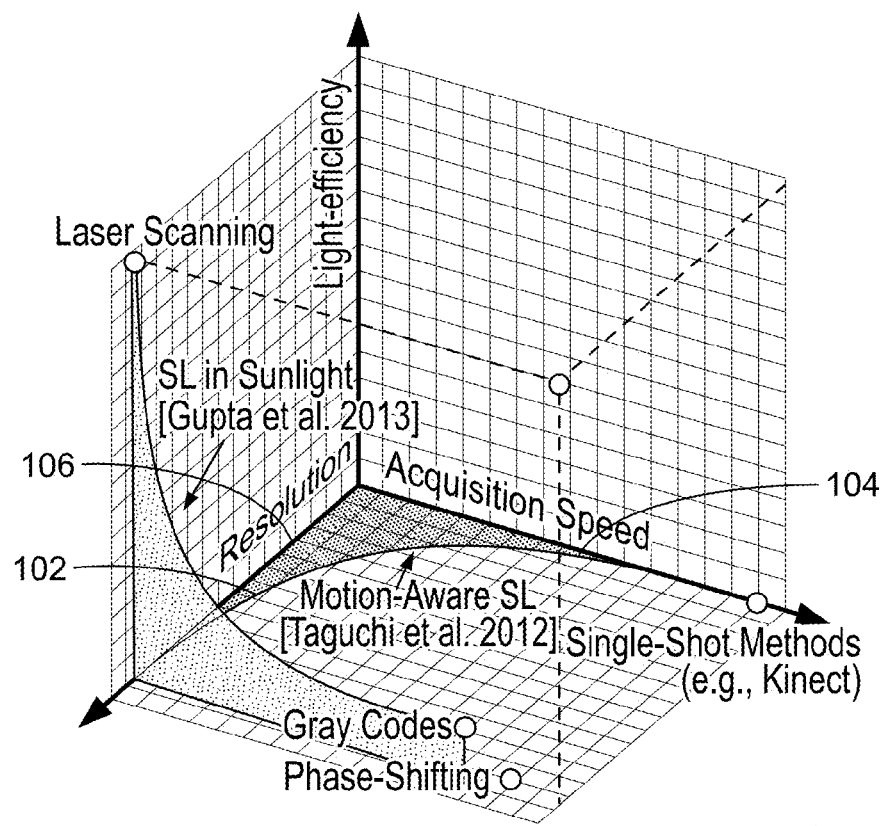
FIG. 1 illustrates a graph depicting trade-offs and differences of scanning systems.

The following detailed description of certain embodiments of the present invention will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

The examples disclosed herein provide an improved structured light technique that uses three-dimensional motion contrast depth scanning to overcome trade-offs typically seen in 3-D scanning systems. The examples disclosed herein utilize motion contrast cameras including two important and biologically inspired properties. First, the examples disclosed herein sense temporal gradients instead of absolute intensities. Second, in the examples disclosed herein, data is read out asynchronously (e.g., independently for each pixel). Utilizing these properties, the examples disclosed herein achieve improved (e.g., near optimal) performance laser scanning system resolution with single-shot speed even in strong ambient illumination. The examples disclosed herein allow 3D vision systems to be deployed in challenging and inaccessible real-world scenarios requiring high performance with limited power and/or bandwidth.

A wide variety of applications such as robotics, bioinformatics, augmented reality, and manufacturing automation, for example, rely on capturing the 3D shape of objects and scenes. Structured light methods provide improved performance for these applications when compared to passive or physical means for 3D surface recovery. Because of practical constraints, structured light systems often have to operate with limited sensor bandwidth and/or light source power. These constraints may force systems to make trade-offs in acquisition speed, resolution and performance in strong ambient light (e.g., outdoors). In particular, two trade-offs preclude structured light systems from being used in several challenging and unpredictable real-world scenarios.

A first trade-off is speed versus resolution. Known structured light scanning methods may achieve either high resolution or high acquisition speed, but usually not both. For example, light scanning produces high quality depth maps by acquiring several hundreds of images. In contrast, single-shot methods produce low resolution depth maps of a single image.

A second trade-off is speed versus light efficiency. Known light scanning methods may achieve either efficient use of light source power or high acquisition speed, but not usually both. Scanning methods focus available light source power to a single point or line and, thus, achieve relatively high signal-to-noise-ratio (SNR) for every measurement. In contrast, methods that spread available light over an entire scene (e.g., phase-shifting, single-shot methods) typically achieve low SNR but high speed.

The examples disclosed herein utilize an illumination source that may vary with time and/or be swept across a scene to provide temporal and/or spatial changes with respect to time to the light emitted from the illumination source. The examples disclosed also utilize a motion contrast sensor to detect changes of the scene and to report measurements when a pixel change exceeds a threshold. The examples disclosed herein also include a processor to determine at least one of a reflectance, a depth or movement of the scene based on the reported measurements of the motion contrast sensor. Because the examples disclosed herein are based on changes (e.g., time differentials) of the scene, they are bandwidth efficient and function in a wide variety of light environments. Because the examples disclosed herein are bandwidth efficient, they are able to convey three-dimensional information very quickly, even in non-ideal lighting conditions or even with non-ideal surfaces of objects.

The examples disclosed herein allow for quick and efficient scanning of scenes and/or objects due to efficient use of bandwidth, thereby allowing three-dimensional scanning of movements and/or moving objects and scenes. Thus, the examples disclosed herein are advantageous for effective performance in high contrast lighting, fog and/or turbid media, and scanning shiny/glossy materials. The examples disclosed herein may be used in for navigation and/or geometry acquisition for vehicles, which may be even operating in snow, fog underwater, or dusty conditions.

The examples disclosed herein may be used in many different scenarios, where objects are needed to be scanned or monitored in three-dimensional space (e.g., actively scanned or monitored). The examples disclosed herein may also be used in scenarios where shiny objects are needed to be scanned such as on an assembly line. In particular, shiny objects can be hard for conventional scanning systems to track and/or properly detect while the examples disclosed herein can track such objects with speed and efficiency. The examples disclosed herein may be also used on autonomous systems where robotic arms are used and/or warehouse systems rely.

The examples disclosed herein may also be applied to driver assist functions. In particular, the examples disclosed herein may be used to scan an environment around a vehicle, to assist with braking and/or lane changing, for example. The examples disclosed herein may also be applied to agriculture for picking robots, for example, which may be required to be in an outdoor lighting environment. The examples disclosed herein may also be applied to rail inspection to detect metal rails, which may be shiny in outdoor lighting, for example. In known examples, detecting the metal rails often requires bulky, high power examples. For rail inspection, the examples disclosed herein may enable a fleet of small autonomous rail inspection units to more effectively cover a much larger service area than a single inspection train.

The examples disclosed herein may also be applied to active suspension systems. Known active suspension systems are not widely used because of a general lack of sensor technology that can accurately predict incoming road geometry. The examples disclosed herein may make relatively quick determinations of the geometry and perform robustly in a wide variety of conditions (e.g., sunlight, dust, etc.). Implementations of the examples disclosed herein may lead to smoother rides for active suspensions and/or decreased cost/complexity with the mechanical components of the suspension.

The examples disclosed herein may be applied to turbine inspections (e.g., in the aerospace or energy industries, etc.). Currently, it is nearly impossible to inspect turbine engines with known examples because of the shininess of the materials and/or limitations on scan speed. However, the examples disclosed herein may allowing testing during manufacturing and/or maintenance to uncover defects that manifest at higher speeds, for example. The examples disclosed herein may also be applied to pipeline inspection, in which current known systems require expert operators to identify defects that may be unnoticed. The examples disclosed herein could enable autonomous inspection robots to effectively identify and track potential defects (e.g., analyze defects and/or conditions with respect to time and/or previous records), which may result in identifying problems before they become a significant issue (e.g., in pipe systems, municipal water systems).

The examples disclosed herein also have military applications. For example, the examples disclosed herein may be used for inspection (e.g., inspection of debris on aircraft carriers, underwater hull inspection, aircraft exterior inspection, etc.), night vision (three-dimensional), projectile detection (e.g., used to track incoming projectiles), landing assistance and vehicle controls. The examples disclosed herein may also be used in gesture recognition (e.g., outdoor gesture recognition) and inspection of vehicles such as ships (e.g., barnacle counting, etc.).

The examples disclosed herein may be also used for robotic mapping and navigation including navigation (e.g., navigation done with photogrammetry) in turbid water conditions, for example. The examples disclosed herein my guide robots in harsh conditions and/or in space exploration.

Turning to FIG. 1, which illustrates a graph depicting trade-offs of scanning systems, structured light systems face trade-offs in terms of acquisition speed, resolution, and/or light efficiency. Laser scanning shown in the upper left of FIG. 1 allows for high resolution scans with highly concentrated light at relatively slow speeds. Single-shot methods, mid-right, obtain depth maps with a single exposure, albeit at a lower resolution. Other methods such as Gray coding and phase shifting, mid-bottom, may compromise speed and/or resolution to achieve middle ground performance, but still have low light efficiency from projector use. Light efficiency versus speed trade-offs are shown in green, while speed vs resolution trade-offs are shown in red. The examples disclosed herein introduce a new structured light method, single-shot laser scanning, in which the ideal point shown may be near the center of the figure.

Existing structured light methods are usually classified by the performance achieved in terms of speed, light efficiency, and resolution illustrated in FIG. 1. In this example, each method is illustrated by a dot or a continuous curve.

Turning to FIG. 1, light scanning systems shown at the upper left are utilized to produce highly accurate results. These systems capture an entire image at each laser position, thereby resulting in highly inefficient use of camera bandwidth because most pixels in each captured image do not receive any light. Slow capture is particularly problematic in dynamic environments. Many strategies have been proposed to improve capture speed, such as Gray codes or phase shifting shown in the lower center portion of FIG. 1. Further pursuit of real-time, single-shot methods, has enabled depth acquisition in motion sensitive applications shown at the right portion of FIG. 1.

Despite their real-time advantage, single-shot methods incur a performance cost because they typically assume locally smooth scene depth to allow window based matching, thus effectively reducing spatial resolution. Improvements have been made by improving the parameters for individual techniques. However, adaptively selecting the best technique for scene content often results in increased temporal resolution at the cost of reduced spatial resolution. Such a relationship is visualized as the Motion-Aware Structured Light curve 102 along the Acquisition Time 104 and Resolution axes 106 shown in FIG. 1.

To make the most efficient use of the available light power, the light source should be concentrated on the smallest possible area. By concentrating the available power onto a single point/line, scanning systems may achieve the highest light efficiency. In scanned illumination systems, most of the sensor bandwidth is not utilized.

Examples disclosed herein introduce a new structured light technique that combines the precision and accuracy of laser scanning with the real-time performance of single shot methods. This technique allows both precision and accuracy along with real-time performance by simultaneously improving light concentration and camera bandwidth. Some examples take advantage of motion contrast cameras that measure only temporal intensity gradients to provide improved use of sensor bandwidth when used with scanned illumination.

A first example prototype single-shot laser scanner has been implemented demonstrating that the examples disclosed herein capture depth maps quicker, more accurately, and have flexibility for a wider variety of ambient lighting conditions than existing structured light systems. Extensive comparisons with commercially available depth cameras such as Microsoft KINECT™, for example, have been made. The proposed technique of the examples disclosed herein will benefit many applications. In some examples, the examples disclosed herein may enable self-driving cars to scan their surroundings faster and in stronger ambient lighting conditions. In some examples, it will improve the quality of 3-D scanning for industrial inspection in light-polluted environments. In some examples, the medical and agricultural industries may benefit from real-time 3-D scanning in outdoor lighting conditions. The examples disclosed herein allow an abundance of practical innovations in a diverse set of areas where 3-D scanning was previously thought to be impractical such as, for example, e-commerce, interior decorating, personalized medicine, and wearable computing.

In order to make comparisons between structured light methods, a fixed power projector can distribute light to R×C positions in a scene imaged by an M×N pixel camera.

Bandwidth Efficiency is a way to quantify the different structured light methods. Sampling efficiency may be measured by the number of Independent Depth Estimates ("IDE") possible for a given method. In some examples, IDE=M×N, where each pixel returns a unique depth value independently of surrounding pixels. When multiple pixels or exposures are needed to recover a point, the number of independent depth estimates will drop below the camera resolution, lowering bandwidth utilization. The bandwidth utilization should be measured relative to the number of camera samples T.

A ratio of independent depth estimates to the total number of samples measured in one scan is the Depth Bandwidth Ratio ("DBR"), where:

$$0 \leq DBR = \frac{IDE}{T} \leq 1 \qquad (1)$$

When objects block projector light, occluded points will produce little or no depth information, lowering the effective DBR. Because of this effect, the DBR is an upper bound on the actual efficiency of the system. In some examples, it is advantageous when a system does not waste samples on areas hidden from the structured light source.

Figure 2:
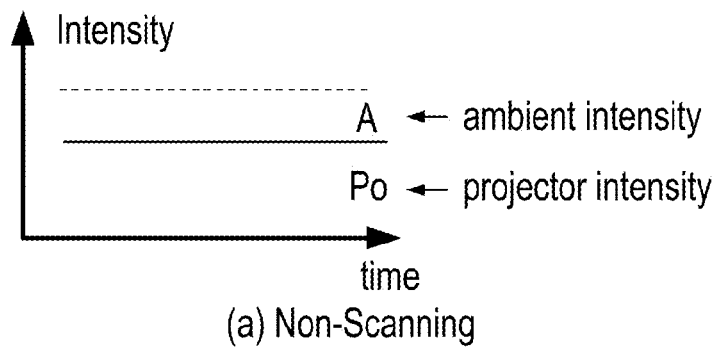
FIGS. 2(a)-(b) show graphs of scanning and non-scanning light intensities.
Figure 2:
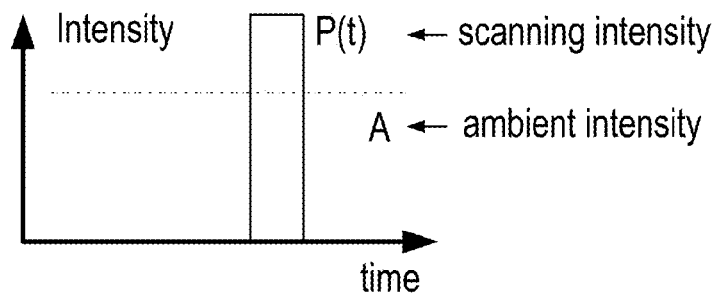

Turning to FIG. 2, structured light methods using a projector with intensity $P_0$ maintain a generally constant average contrast compared to ambient lighting A. Scanning methods generally concentrate projector power within a momentary intensity P(t) while an ambient intensity A remains generally constant. As a result, such methods can producer higher instantaneous contrast.

The average power from a non-scanning projector and the average power from ambient lighting remain generally constant over the entire exposure, as shown in (a) of FIG. 2. To contrast, scanning illumination can be considered with the equivalent average power of a non-scanning projector. Scanning methods concentrate light power onto a small region for a brief interval, thereby resulting in greater instantaneous contrast. Such an effect is represented by the higher peak intensity shown in (b) of FIG. 2. To describe light efficiency, the available power to the Light Concentration Region (LCR), which is the area receiving light at a given instant, is compared. The fraction of light distributed to each illuminated point in the scene is the Light Efficiency Ratio, or LER:

$$0 \leq LER = \frac{1}{LCR} \leq 1 \qquad (2)$$

Figure 3:
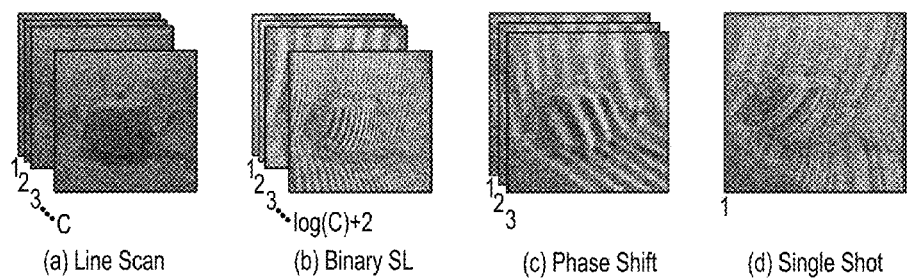
FIG. 3 shows example captured data for different structured light scanning techniques.

Turning to FIG. 3, (a) demonstrates that line scanning captures all disparity measurements in C images. In FIG. 3, (b) depicts binary patterns reduce the number of required captures to log(C)+2. Also in FIG. 3, (c) illustrates that phase shifting recovers disparity from projected sinusoids in just 3 images. In FIG. 3, (d) illustrates that single-shot methods require only a single exposure.

Table 1 below shows the differences between structured light methods characterized by number of total measurements, T, DBR, and LER

|     | Point Scan | Line Scan | Binary Structured Light | Phase Shifting | Single Shot |
| --- | --- | --- | --- | --- | --- |
| T   | M × N × R × C | M × N × C | M × N × (Log(C) + 2) | 3 × M × N | M × N |
| DBR | $\frac{T}{R \times C}$ | $\frac{1}{C}$ | $\frac{1}{\log(C)+2}$ | ⅓ | α |
| LER | 1 | $\frac{1}{R}$ | $\frac{1}{R \cdot C}$ | $\frac{1}{R \cdot C}$ | $\frac{1}{R \cdot C}$ |

Table 1 contains T, DBR, and LER values for existing structured light methods and the example single shot methods in accordance with the teachings of this disclosure. These values can be used to contrast performance across different techniques.

Point scanning sequentially illuminates individual points in the scene to capture an image for each point to be identified during processing. Single point illumination concentrates light to achieve an LER of approximately 1. R×C illuminated points are each sampled by an M×N image, therefore the total number of samples T is R×C×M×N. For every sample, only 1 pixel contains depth information, resulting in the following:

$$DBR = \frac{T}{R \times C}.$$

Line scanning illuminates and captures one row or column at a time. Assuming projector rows are used, T=C× M×N as seen in (a) of FIG. 3. M measurements are made of each image so the DBR may increase to $$\frac{1}{\log(C)+2}.$$

Conversely, the LER drops to $$\frac{1}{R}$$

since the light is spread over a full projector row.

Projector rows of binary structured light can be illuminated according to binary or gray code sequences. In such examples, the number of total samples decreases to M×N×(log(C)+2) as seen in (b) of FIG. 3. The number of recovered points per exposure increases exponentially, therefore, the DBR increases to $$\frac{1}{\log(C)+2}.$$

The example systems disclosed use a digital projector rather than a laser, spreading light across all points. Therefore, $$LER = \frac{T}{R \cdot C}.$$

In phase shifting, projected sinusoids make use of greyscale intensities to outperform binary coding. The projector row position can be recovered from the sinusoidal phase after three captures, or T=3×M×N ((c) of FIG. 3). Each camera pixel is only sampled three times per point in this case, or $$DBR = \frac{1}{3}.$$

Projector light is spread over the entire image, thereby resulting in $$LER = \frac{T}{R \cdot C}.$$

For single shot methods, most or all projector information can be captured in one exposure. Single shot methods require one frame to capture so, therefore, T=M×N as seen in (d) of FIG. 3. The number of pixels used to index each projector position varies, therefore, the resolution drops by an implementation constant α. This constant also determines how many independent depth values are recovered per sample. Therefore, the DBR is also a. As described above, because a projector is used, $$LER = \frac{1}{R \cdot C}.$$

Methods suited to different scene contents can be combined in a hybrid method to achieve improved results. Motion-aware structured light, for example, uses motion analysis to reallocate bandwidth for either increased resolution or decreased sampling time within a fixed DBR. Structured light in sunlight proposes to increase LER in high ambient lighting by decreasing DBR. Hybrid methods essentially aim to prioritize the allocation of LER and DBR depending on scene content, but are still subject to the same trade-offs as the basic structured light methods.

As mentioned above, improved bandwidth usage occurs when a DBR is approximately one. In some examples, improved usage of light source power occurs when a LER is approximately one. In some examples, an overall improvement that combines bandwidth and light source usage. In some examples, improved conditions are reached when a DBR is approximately one and a LER is approximately one. Intuitively, an LER approximately equal to one implies the use of scanned illumination. On the other hand, in some examples, an improved DBR may indicate that each scene point is sampled only once, suggesting a single-shot method. In some examples, scanned illumination methods have low DBR and single shot methods have low LER. From this result, it would seem that an effective structured light system is a contradiction in terms. One issue is whether a system can be both single-shot and scanning.

Such a conflict may be addressed by noting that illumination scanning systems severely underutilize camera bandwidth. If a camera captures only the scene points illuminated by the light source rather than capturing the full image, scanned illumination would no longer be inefficient. Such a camera may be constructed drawing motivation from biological vision where sensors may only report salient information. In particular, organic photoreceptors respond to changes in instantaneous contrast by implicitly culling unmoving background information. If such a sensor is used to capture a scene lit with scanning illumination, measurement events will only occur at the instant when illumination falls on a scene point. By definition, this event will occur at the time when scene points produce the largest instantaneous contrast. Such a method would be single-shot in the sense that each pixel takes only one measurement, albeit asynchronously (different pixel measurements are recorded at different time instants). Combining a biological sensor system or biologically-inspired sensor system with scanned illumination may produce a structured light system with improved LER and DBR.

Digital sensors that mimic the differential nature of biological photoreceptors are now available as commercially packaged camera modules in addition to laser raster scanners. Thus, these such readily-available components may be used to build a structured light system with a minimal amount of system integration such as a Single Shot Laser Scanner in accordance with the teachings of this disclosure.

Figure 4A:
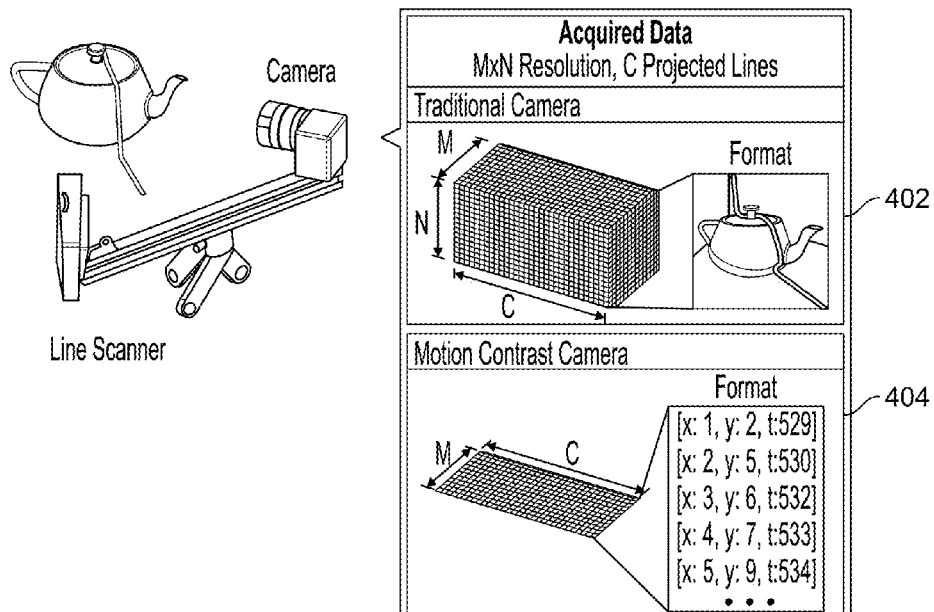
FIG. 4A contrasts a known 3-D scanning system with a motion contrast camera that may be used in the examples disclosed herein.

Turning to FIG. 4A, which compares a known camera to a motion contrast camera that may implemented in the examples disclosed herein, data captured from a known camera capturing C scanned lines typically use M×N×C samples to complete an acquisition and is shown in a row 402. The camera data is reported in the form of 2D intensity images. A row 404 shows data from a motion contrast camera that may be used in the examples disclosed herein and that reports information for the projected line using a bandwidth of M×C per acquisition, in contrast to the traditional camera. The motion contrast camera output includes an x coordinate, y coordinate, time triplet for each sample.

A motion contrast camera where pixels on the sensor independently and asynchronously generate output when observing a change in intensity has been recently introduced. From a host computer perspective, the motion contrast output is a continuous stream of time-space coordinates rather than an image, though averaging can be used to produce a traditional image. This output modality is illustrated in FIG. 4. In some examples, where a traditional camera will capture an entire frame for each projector column during a scan, thereby resulting in a bandwidth requirement of C×M×N, the motion contrast camera will report the column position for each row using a total bandwidth of C×M. The relationship between the volume of data produced by each camera is depicted in the center portion of FIG. 4A. Previously, it was observed that DBR will drop when projected light is occluded from the camera point of view. A motion contrast camera will waste little or no bandwidth because occluded points will not register any change in contrast. The DBR for a motion contrast camera is, therefore, often improved.

Figure 4B:
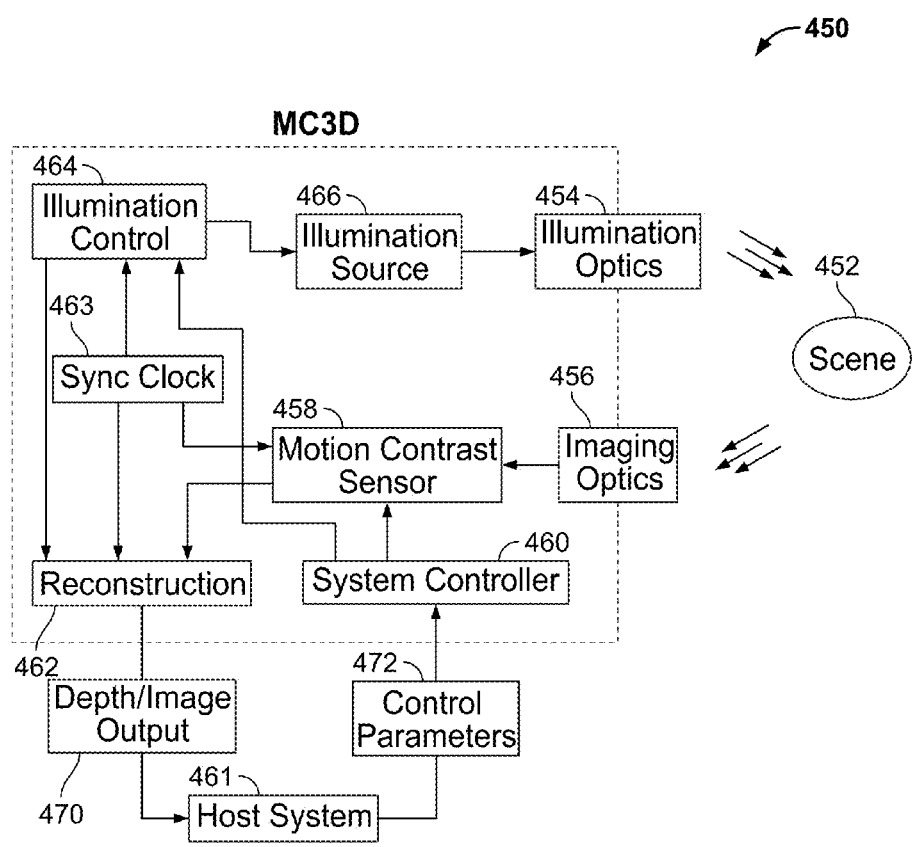
FIG. 4B is a schematic illustration of an example scanning system in accordance with the teachings of this disclosure.

FIG. 4B is a schematic illustration of an example scanning system 450 in accordance with the teachings of this disclosure. The example scanning system 450 is being used to generate a three-dimensional scan of a scene 452. The example scanning system 450 includes illumination optics 454, imaging optics 456, a motion contrast sensor 458, a system controller 460, a host system 461, a reconstruction circuit 462, a sync clock 463, an illumination control 464 and an illumination source 466.

In operation, the illumination control 464 directs the illumination source 466 to provide light to the scene 452 via the illumination optics 454. Through the imaging optics 456, which consists of a lens with a bandpass filter, the motion contrast sensor 458 detects light reflecting from the scene 452 and conveys data related to changes in brightness (e.g., time differentials) of pixels that detect changes greater than a threshold to the reconstruction circuit 462. Both the illumination control 464 and the motion contrast sensor 458 of the illustrated example utilize the sync clock 463 for timing information. For example, both the illumination control 464 and the motion contrast sensor 458 may use the sync clock 463 to record time stamps. As will be discussed in greater detail in connection with FIGS. 5A-5F, the reconstruction circuit 462 calculates a depth, a reflectance and/or motion of the scene 452 based on information from the illumination control 464 and the motion contrast sensor 458 in conjunction with timing information from (e.g., time stamped from) the sync clock 463. In this example, the reconstruction circuit 462 conveys depth/image output that has been reconstructed to the host system 461, which may be a personal computer ("PC"), microcontroller, Field Programmable Gate Array ("FPGA") or System-on-a-Chip ("SoC").

The system controller 460 of the illustrated example controls both the motion contrast sensor 458 and the illumination control 464. In particular, the host system 461 provides the control parameters 472 to the system controller 460 to direct the illumination control 464 to direct the illumination source 466 and/or the illumination optics 454 to direct light (e.g., sweep the light) towards portions of the scene 452. The system controller 460 also directs the motion contrast sensor 458 to asynchronously transmit data (e.g., data a per-pixel level) to the reconstruction circuit 462 and/or sets thresholds (e.g., brightness change thresholds, etc.) for the motion contrast sensor 458. In this example, the motion contrast sensor 458 reports pixel location and a time of any sensed change that exceeds a threshold. In some examples, the host system 461 generates and/or analyzed three-dimensional models based on the depth/image output 470 from the reconstruction circuit 462.

In this example, the motion contrast sensor 458 is a motion contrast sensor camera (e.g., an iniLabs DVS128™ motion contrast camera) and both the illumination source 466 and the illumination optics 454 are implemented by a laser pico-projector (e.g., a Microvision SHOWWX™ laser pico projector). The examples disclosed process the DVS output and a stream of space-time addresses to recover a disparity map and point cloud. In this example, the illumination control 464 is provided by a raster pattern. In some examples, the illumination optics 454 are provided by a Thorlabs™ galvanometer and lens. In this example, the depth/image output 470 is a color coded depth map.

The example scanning system 450 of the illustrated example has a commercial implementation of the iniLabs DVS128™ with a 1st generation 128×128 CMOS motion contrast sensor, which has been used in research applications such as high frequency tracking, unsupervised feature extraction and neurologically-inspired robotic control systems In this example, the iniLabs DVS128™ uses a 10 kHz internal clock. Alternatively, an external clock source may be used. The system controller 460 of the illustrated example is a National Instruments™ NI-DAQmx utilizing a Matlab script. Reconstruction at the reconstruction circuit 462 of the illustrated example is provided by a Java implementation or Matlab implementation with disparity estimation. In this example, the NI-DAQmx is connected to the iniLabs DVS128™ and programmed to pulse at the beginning of each frame. In this example, a color coded depth-map is used. In this example, the control parameters 472 are determined by motion contrast sensor bias settings, raster scan dimensions and speed.

In some examples, the illumination source 466 is a 3.5 mW diode laser. In some examples, illumination control may occur by Lissajous patterns, stochastic (ML or MAP) sampling, random patterns, binary coding, motion-aware sampling, or fringe projection.

In some examples, an illumination source may be laser or projector source of any wavelength or power observable by the motion contrast sensor. In some examples, illumination optics may be provided by a Digital Micromirror Device ("DMD"), a Liquid-Crystal Display ("LCD"), LCOS, scanning or rotating mirrors/prisms, diffraction gratings, lenses, filters, scanned fibers or other fiber elements, waveguides. In some examples, a motion contrast sensor may be any sensor capable of producing asynchronous, per-pixel output from instantaneous changes in the observed scene. In some examples, imaging optics may be provided by DMD, LCD, LCOS, scanning or rotating mirrors/prisms, diffraction gratings, lenses, filters, scanned fibers or other fiber elements, or waveguides.

In some examples, reconstruction may be provided by any algorithm that synthesizes known illumination pattern and timing with output from a motion contrast sensor to reconstruct depth or intensity in the scene. Additionally or alternatively, reconstruction may include signal and image processing stages based on image formation models or statistical priors. In some examples, reconstruction may include recognition or analysis stages for higher level semantic output.

In some examples, the depth/image output 470 can be a depth and intensity coded image, point cloud, mesh, volume, serialized space-time events, high-level event or object semantic tags.

In some examples, event timestamps are assigned using a 100 kHz counter (e.g., in the 128 pixel line scanning setup, the maximum resolvable scan rate is nearly 800 Hz). It has been determined that the dynamic range is more than 120 dB due to the static background rejection discussed above. Such specifications illustrate that the motion contrast sensor retains the bandwidth and light efficiency advantages of an effective system.

In some examples, a sensor exposes a number of analog controls via the USB interface to adjust properties such as the differentiator threshold, an event rate cap, the photodiode bias, etc. During experiments, bias (gain) is minimized to reduce noise and the event rate has been maximized to use all or most of the available bandwidth and maximize a differentiator threshold to reject extraneous events.

In some examples, a laser pico-projector is utilized as an active illumination source. In some examples, a projector displays a VGA input at 848×480 60 Hz by scanning red, green, and blue laser diodes via a MEMS micromirror. Such a micromirror follows a traditional raster pattern and, thus, functions as a self-contained laser spot scanner. This projector has been used previously to demonstrate structured light scanning in sunlight. In this example, the projector's 60 Hz scan rate is fully utilized, thereby resulting in an effective 60 fps.

In other examples, synchronization may be achieved between the projector and the motion contrast event stream by connecting the VGA VSYNC pin, which drops low at the start of each frame, to the external synchronization input on the camera using a custom connector. A falling edge on the camera synchronization input causes the controller to insert a special time-stamped event into the output stream that can be used as a reference to compare the timing of subsequent pixel events. Since there is no closed loop control over the MEMS device, the expected laser angle must be estimated as a function of the corresponding motion contrast event time-stamp. Using a simple static scene, such as a flat card, the fixed difference in rate can be determined between the VGA scan rate and the MEMS scan rate. In some examples, the disparity can be recovered as:

$$D(ex,ey)=ex-128*(et-k)\bmod \omega \qquad (3),$$

where $\omega$ is the measured scan rate, k is a manually configured offset to the time-stamp of the first raster scan, and $e_{x,y,t}$ is the space-time coordinate of each received event.

The broad availability of depth cameras has led to their use in many single-shot 3-D applications from unmanned aerial vehicles to music videos. Such commercially available depth cameras have similar form factor and equivalent field of view when cropped to the same resolution as the prototype in accordance with the examples disclosed herein. Therefore, they are used to compare to experimental results from capturing test objects with both systems at identical distances and lighting conditions (e.g., near-identical test conditions).

Figure 5A:
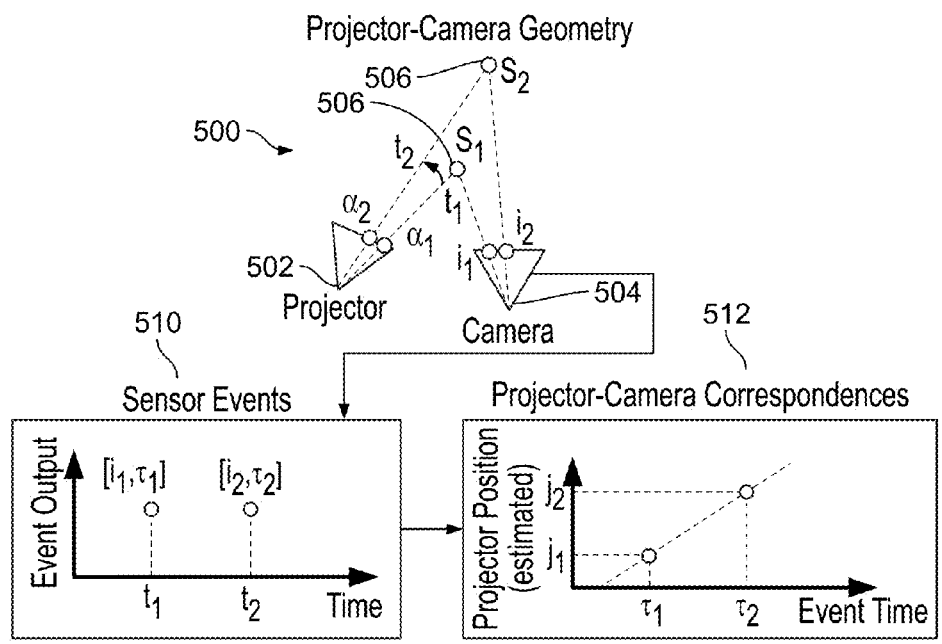
FIGS. 5A-5F illustrate example scanning systems and examples of how processing (e.g., reconstructing) of data that may be used in the examples disclosed herein.

FIGS. 5A-5F illustrate example scanning systems and examples of how processing (e.g., reconstructing) of data that may be used in the examples disclosed herein. Turning to FIG. 5A, FIG. 5A illustrates an example scanning system 500 in accordance with the teaching of this disclosure. The example scanning system 500 includes a projector 502 and a camera 504. In this example the projector 502, which is a laser line scanner in this example, sweeps a scene striking scene points denoted by $s_1$ and $s_2$. The projector 502 of the illustrated example illuminates projector positions $\alpha_1$ and $\alpha_2$ at times $t_1$ and $t_2$, respectively. In this example, a graph 510 illustrates the corresponding sensor events and graph 512 illustrates the projector-camera correspondences. As can be seen in FIG. 5A, the camera 504 registers changing pixels at $i_1$ and $i_2$ at times $t_1$ and $t_2$, respectively. These events are registered as location/event time pairs $[i_1, \tau_1]$ and $[i_2, \tau_2]$. The estimated projector positions $j_1$ and $j_2$ of the illustrated example are recovered based on the event times. Based on these recovered projector positions, a depth is calculated/reconstructed using the correspondence between event location and estimated projector location.

In this example, it is assumed that the example scanning system 500 is free of distortion, blurring and/or aberration, and that the projector 502 and the camera 504 have substantially equivalent focal lengths, and are separated by a baseline. In an example one dimensional analysis, a scene point s=(x, z) maps to column i in the camera image and the corresponding column, a, in the projector image of FIG. 5A. The equation below illustrates contributions of direct and indirect illumination that may be modeled by a light transport matrix, T, which maps a set of R×C projected intensities p from the projector 502 onto the M×N measured intensities, c, from the camera 504:

$$c=Tp \qquad (4),$$

where the component of light that is directly reflected to the $i^{th}$ camera pixel is given by $T_{i,\alpha}p_\alpha$, where the index, a, depends on the depth/disparity of a corresponding scene point.

Based on the right side of Equation 4, after discretizing time by the index, t, a set of K=R× C projected patterns becomes:

$$P=[p_1, \ldots p_k]=I_o\delta_{i,t}+I_b \qquad (5),$$

where $\delta$ is the Kronecker delta function, $I_o$ is the power of the focused laser beam, and Ib represents a relatively small amount of background illumination introduced by the projector 502.

Based on Equation 4, the light intensity directed to the camera 504 is:

$$c_{i,t}=T_{i,\alpha}P_{\alpha,t}=(I_o\delta_{i,t}+I_b)T_{i,\alpha} \qquad (6),$$

where $T_{i,\alpha}$ denotes the fraction of light reflected in direction, i, that was incident in direction, $\alpha$ and the pair [i, $\alpha$] represents a projector-camera correspondence. Motion contrast cameras sense the time derivative of the logarithm of incident intensity:

$$c_{i,t}^{MC} = \log(c_{i,t}) - \log(c_{i,t+1}), \qquad (7)$$

$$= \log\left(\frac{I_0 + I_b}{I_b}\right)\delta_{\alpha,t}. \qquad (8)$$

Based on the above, the motion contrast intensity is thresholded and set(s) of space-time indices are transmitted asynchronously as tuples:

$$[i,\tau],s\cdot t\cdot c_{i,t}^{MC}>\in,\tau=t+\sigma \qquad (9),$$

where $\sigma$ is the timing noise that may be present due to pixel latency, multiple event firings and/or projector timing drift. The tuples may be transmitted as an asynchronous stream of events that establish correspondences between camera columns, i, and projector columns j=$\sigma$·S, where S is the projector scan speed (columns per second). The depth can then be calculated as:

$$z(i) = \frac{bf}{(i - \tau \cdot S)}. \qquad (10)$$

As can be seen in the equations above, the example scanning system 500 implicitly culls unnecessary measurements. In contrast, a conventional camera samples an entire image for each scanned point. While a conventional laser scanner may depend on reflectivity, the example scanning system 500 does not.

Figure 5B:
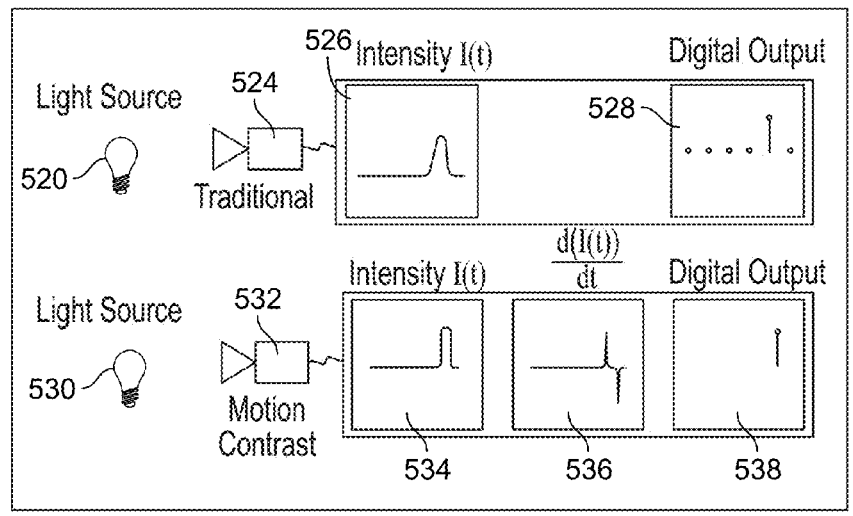

FIG. 5B illustrates per-pixel output from traditional vs the examples disclosed herein when presented with generally changing illumination. In the illustrated example of FIG. 5B, a light source 520 illuminates a known (e.g., traditional) scanning camera 524. The camera 524, based on the light source being illuminated for a finite time, records intensity data 526 (e.g., an intensity time history). As a result, a digital output 528 is recorded based on the intensity data 526. The digital output 528 has numerous data points.

In this example, a light source 530 illuminates an example motion contrast sensor 532. Similar to the traditional camera 524, an intensity history 534 is recorded. However, in contrast to traditional scanning techniques, the example motion contrast sensor 532 also records and/or calculates a time differential (e.g., logarithmic time differential) 536, which is then reconstructed (e.g., recovered) as digital output 538, which does not have the multiple points of the digital output 528. In other words, the examples disclosed herein implicitly cull data, thereby allowing more efficient use of data bandwidth.

Figure 5C:
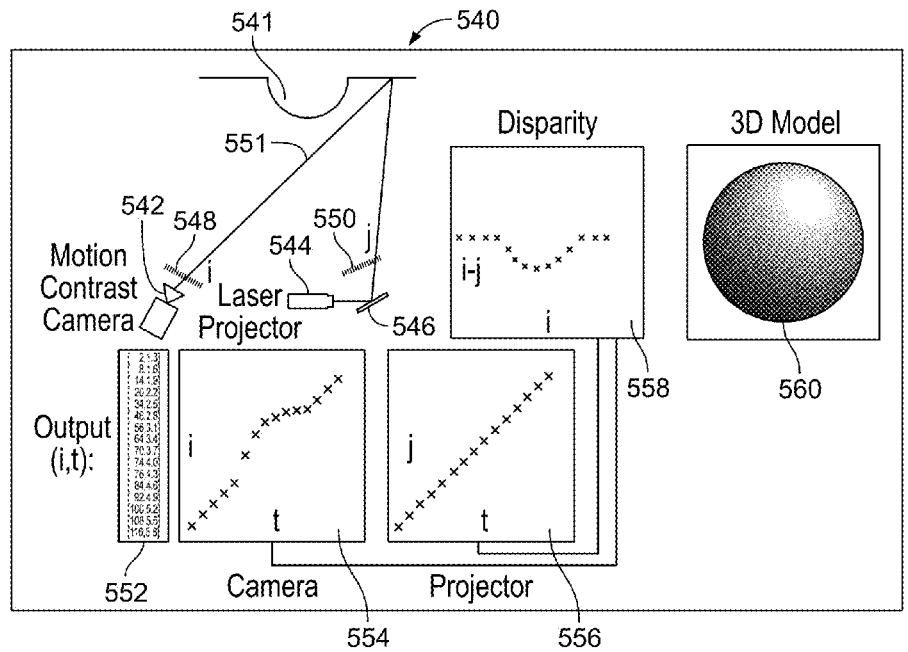

FIG. 5C illustrates a scanning system 540 to generate a depth map of an object 541 of a scene. The scanning system of the illustrated example includes a motion contrast camera 542 a laser projector 544, which may be modulated and/or pulsed, a light redirector (e.g., a re-directable mirror, a movable lens, etc.) 546, a locational index (e.g., map) 548, which corresponds to the motion contrast camera 542, and second locational index 550, which corresponds to the laser projector 544.

In operation, the laser projector 544 transmits a light 551, which is not pulsed in this example but may be pulsed, towards the light director 546, which directs the transmitted light over different portions of the object 541. In this example, the light director (e.g., re-director) is actuated and/or moved to sweep the transmitted light 551 over different portions (e.g., areas, zones) of the object 541. In some examples, a translating map with a projector may be used to sweep the transmitted light 551. As the transmitted light 551 is detected at different portions (e.g., one-dimensional addresses) of the index 548, a corresponding output is recorded at the motion contrast camera 542, for example, to record the index as a function of time, as indicated by logged data 552. A graph 554 of the illustrated example shows recorded light measurement readings relative to the locational index 548 as a function of time. Likewise, the example graph 556 shows transmitted light data relative to the locational index 546 as a function of time. Based on a disparity between measurements, which is shown in graph 558, a three-dimensional model 560 and/or depth map of the object 541 is calculated (e.g., reconstructed, integrated, summed, etc.) using any of the equations described above in conjunction with FIG. 5A, for example. Additionally or alternatively, a reflectance or motion of the object 541 may be calculated.

While the example of FIG. 5C is one-dimensional, any appropriate number of dimensions may be used (e.g., two-dimensional, three-dimensional, etc.) to generate disparities that may be used to calculate depth maps, for example. While a pulsed laser is utilized in the laser projector 544 of this example, the laser projector 544 may be modulated in any appropriate pattern (e.g. a stepped pulse, a varying step pulse, varying pulses, etc.) and/or may have varying frequencies. In some examples, the frequency of the scanning mirror 446 may be varied (e.g., rate and/or range of motion, etc.) based on recorded measurements and/or after being directed to obtain portions of a scene in higher resolution.

While a laser scanner is shown in the example of FIG. 5C, any appropriate illumination source may be used, including, but not limited to, a laser scanner with arbitrary trajectory, an LCD or DMD projector, a fringe projector, a translated physical mask with a light source, a translated diffraction grating with laser light source, or any other appropriate means to distribute light to known locations at defined time and/or based on a system clock.

Figure 5D:
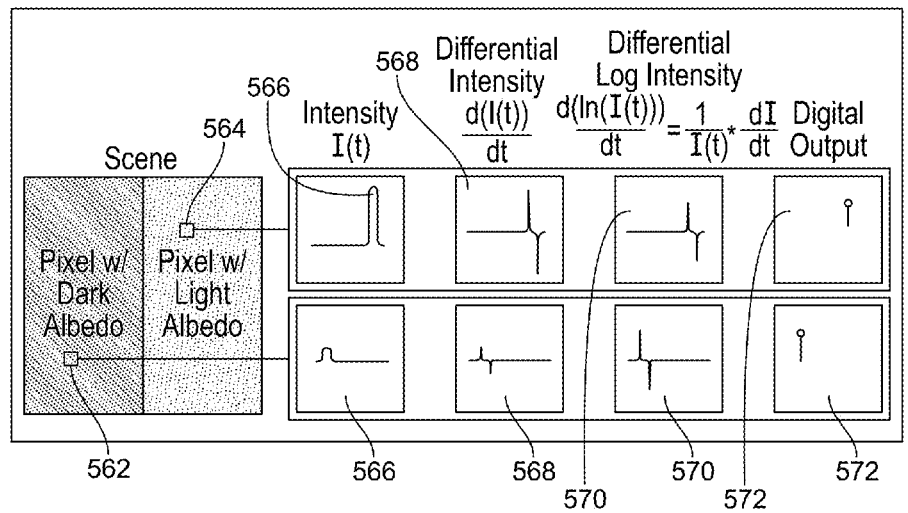

FIG. 5D illustrates how the examples disclosed herein may effectively create a depth map of a scene with varying reflectiveness, which may be expressed as multiple albedos. In particular, the albedos may represent different surfaces having different proportions (e.g., ratios) of incident light that are reflected therefrom. In this examples, the scene includes a first pixel 562 on a dark albedo and a second pixel 564 on a light albedo. In this example a laser sweeps from the left to the right (e.g., from the dark albedo to the light albedo).

Upper and lower intensity graphs 566 illustrate the intensity measured at the first and second pixels 564 and 562, respectively, as a function of time. The lower intensity graph corresponding to the first pixel 562 has a lower intensity amplitude than the upper intensity graph corresponding to the second pixel 564. Upper and lower differential intensity graphs 568 illustrate time differentials of the intensity graphs 566, which are used to generate a depth map of the scene. In some examples, additionally or alternatively, log differentials such as those shown in the upper and lower log differential graphs 570 are generated to determine the depth map. Based on the time differentials and/or logarithmic time differentials, a depth map in a digital output form is defined as shown in digital output graphs 572. The examples disclosed herein allow accurate depth measurements and avoid and/or reduce errors introduced by different reflective surfaces. These errors may cause errors in conventional scanning systems.

Figure 5E:
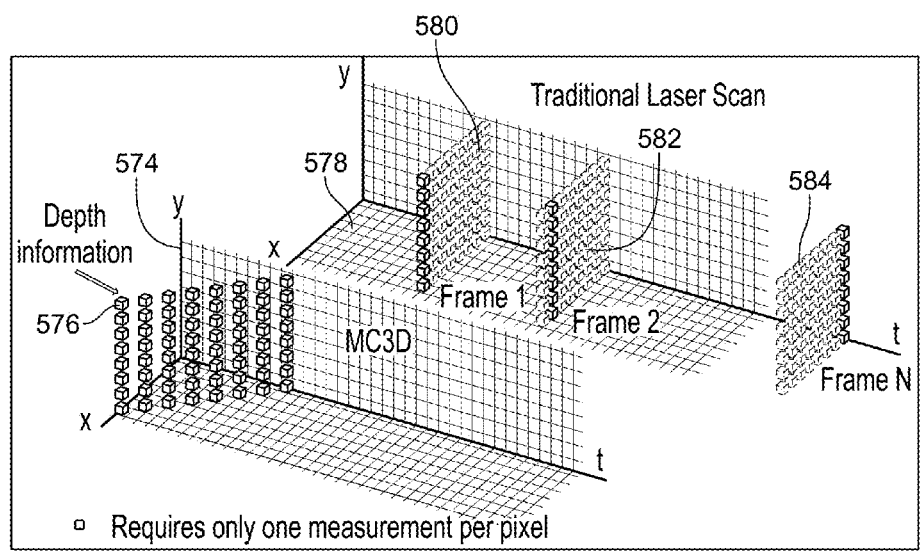

FIG. 5E illustrates the bandwidth advantages of the examples disclosed herein. A first graph 574 shows data 576 obtained with the examples disclosed herein. Because the data 576 is based on calculations time differentials and/or logarithmic time differentials, the data 576 is obtained relatively quickly.

In contrast, the second graph 578 depicts a traditional laser scanning method. Instead of quickly obtaining depth information as shown with respect to graph 576, data in this traditional laser scanning method is obtained as individual frames 580, 582, 584. Each frame of the frames 580, 582, 584 only captures a portion of a respective scene per each frame and, thus, other portions of the scene are not captured in each frame, thereby wasting bandwidth and potentially resulting in longer scan times.

Figure 5F:
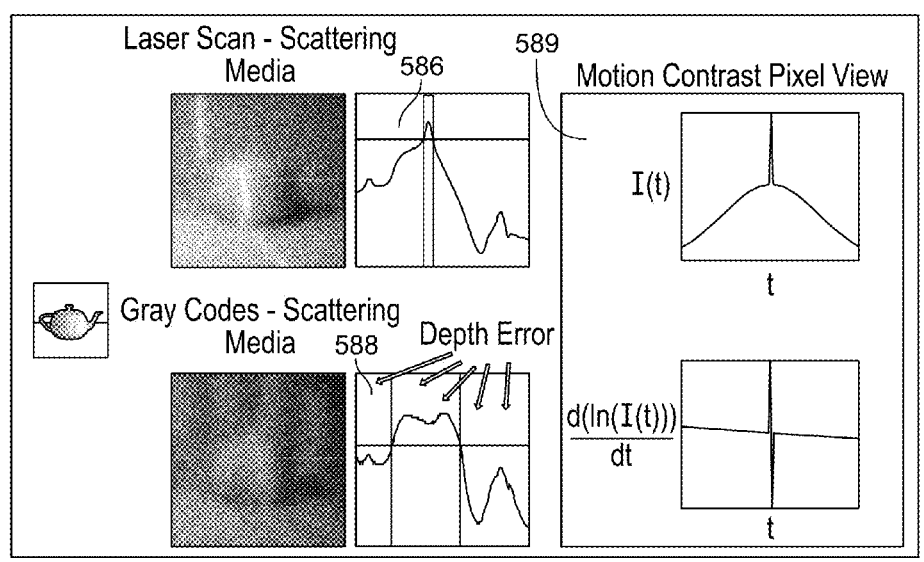

FIG. 5F illustrates how the examples disclosed herein may more effectively create depth maps through scattering media in comparison to other conventional methods. Graph 586 depicts a depth map of a conventional laser scan and graph 588 depicts a depth map obtained by conventional gray code scanning. Both the graphs 586 and 588 depict considerable errors attributed to scattering.

In contrast to the conventional methods, example graphs 589 using the examples described herein depict an intensity graph and a logarithmic differential of the intensity graph, both of which are much more clearly defined than the graphs 586 and 588. In particular, the graph 588 shows a relatively large amount of depth error. Thus, the examples disclosed herein may be effective in eliminating depth error that may be caused by scattering media.

Figure 6A:
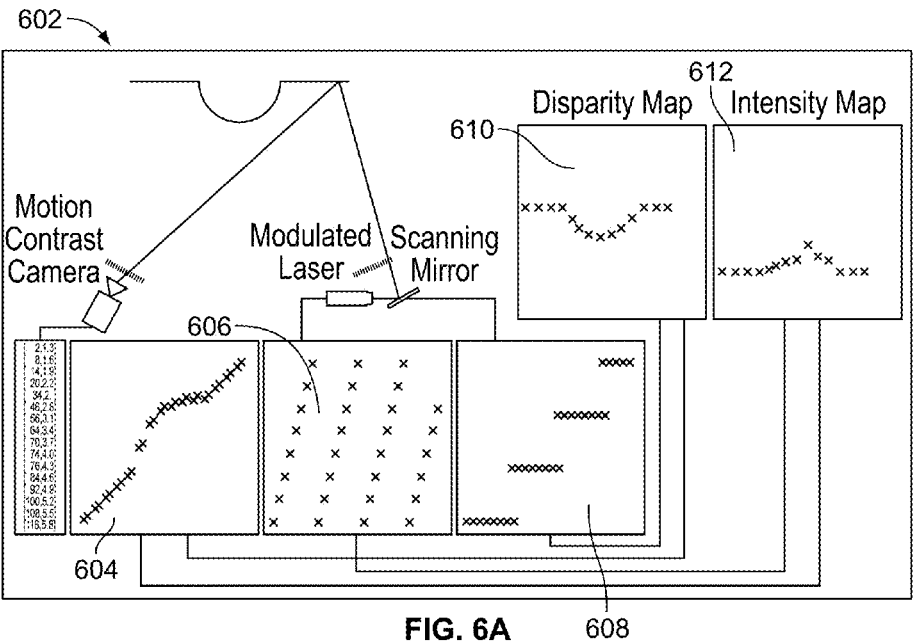
FIGS. 6A-6B illustrate example scanning systems with depth mapping as well as imaging capabilities.

FIG. 6A illustrates an example system 602 that may scan a scene with multiple albedos (e.g., reflection coefficients) to generate both a depth map as well as imaging of the scene. Similar to the scanning system 540 described above in connection with FIG. 5C, a modulated laser sweeps across an object. In this example, a camera output 604 with respect to time is determined. Also, a modulated laser signal 606 is used as a laser scanner of the example system 602, and is swept across an object of the scene. In this example, a scanning mirror, which pivots and/or rotates to sweep transmitted light from the laser across the object, has a characteristic output 608.

Similar to the scanning system 540 of FIG. 5C, the example system 602 also generates a disparity map 610 to determine a depth map of the object. In this example the disparity map 610 is based on the camera output 604 and the characteristic output 608 of the scanning mirror. However, in contrast to the scanning system 540, the example system 602 also generates an intensity map 612 for imaging of the scene (e.g., mapping the reflectance of the scene, etc.).

Figure 6B:
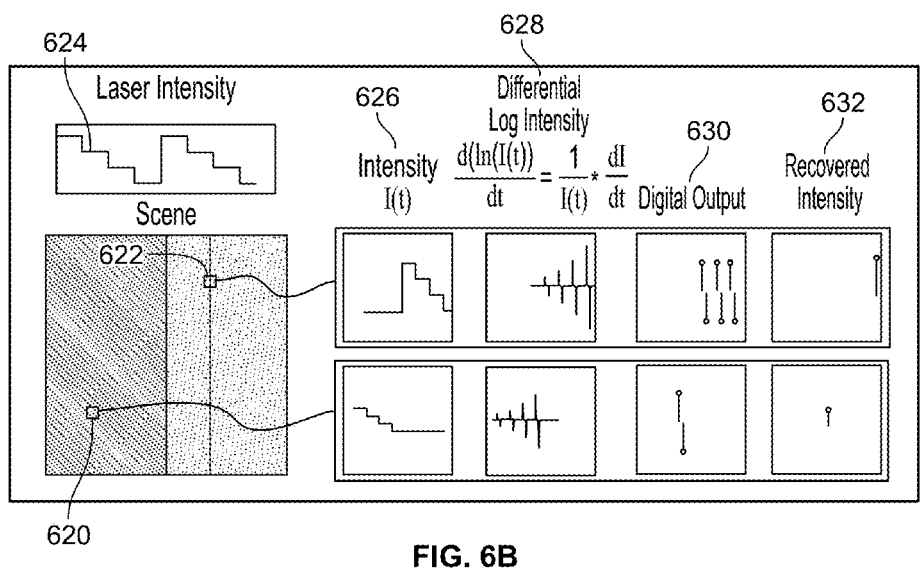

FIG. 6B illustrates how a scanning system such as the scanning system 602 of FIG. 6B may scan a scene with multiple albedos (e.g., reflection coefficients) to generate both a depth map as well as imaging of the scene. In this example, the scene includes a first pixel 620 in a dark albedo and a second pixel 622 in a light albedo. In this example, a laser is varied (e.g., modulated) in a profile shown by a graph 624. Upper and lower intensity plots 626 corresponding to the second pixel 622 and the first pixel 620, respectively, depict a recorded intensity at a camera as a scanning laser, for example, with the varying profile shown by the graph 624 is swept across the scene. Corresponding upper and lower logarithmic time differentials 628 are also depicted.

Similar to the depth maps 572 described above in connection with FIG. 5D, based on the time differentials and/or logarithmic time differentials, depth maps 630 corresponding to the first pixel 620 and the second pixel 622, respectively, are defined in a digital output form. In contrast to the example of FIG. 5D, however, recovered intensity plots 632 corresponding to the first pixel and the second pixel 622 are additionally defined. The recovered intensity plot characterizes the intensity at the first and second pixels 620, 622, thereby defining imaging of the scene.

In some examples, a Bayer filter may be used in conjunction with a transmitting laser (e.g., a sweeping laser) to provide color imaging of the scene. In some examples, red/green/blue filters may be used to provide color imaging of the scene. In yet other examples, different color lasers (e.g., red, green, blue, etc.) may be used to generate color images of the scene in conjunction with the depth mapping generated based on time differentials.

Figure 7A:
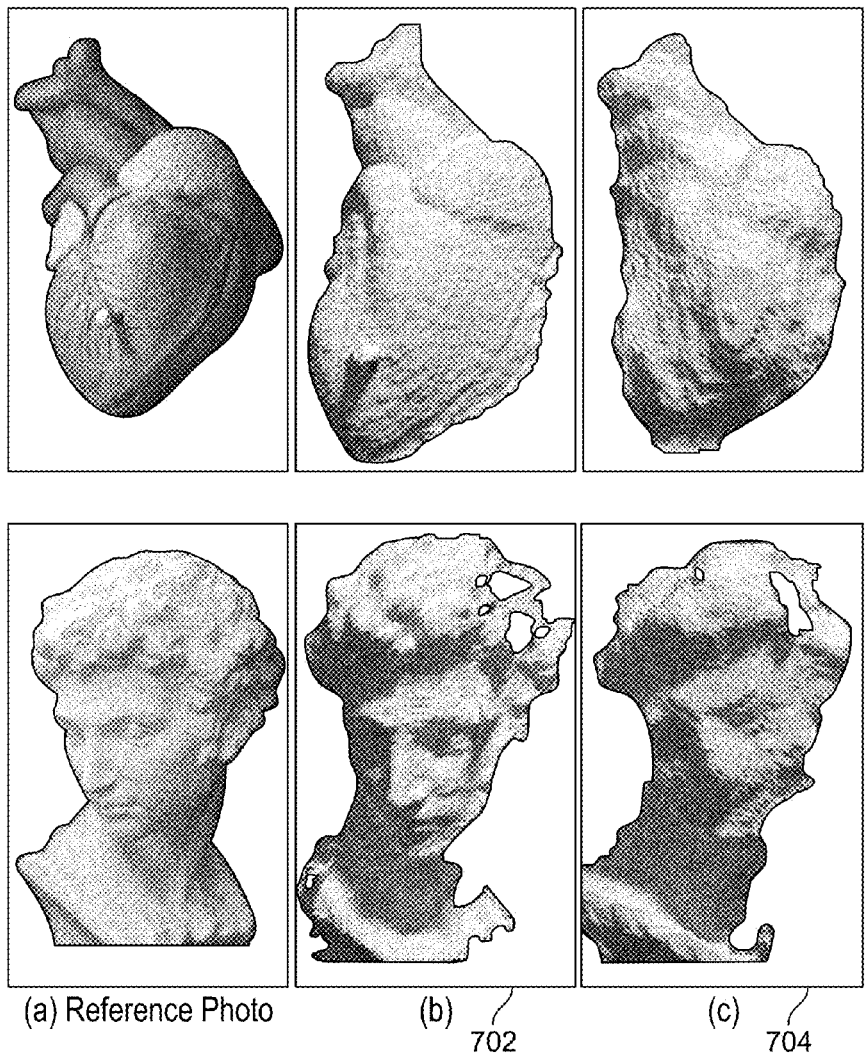
FIGS. 7A-7C show comparisons of scanning results representative of the examples disclosed herein with a commercially available depth camera.

Turning to FIG. 7A, to demonstrate the advantages of the examples disclosed herein, two sample objects were used: a medical model of a heart and a miniature plaster bust. These sample objects both contain a variety of smooth surfaces, fine details, and silhouette edges. The exposure time was fixed for both systems at one second. Most or all of the data captured by the system within that period of time was averaged to produce a single disparity map. A 3×3 median filter was applied to the output of both systems. The resulting scans shown in FIG. 7A show increased fidelity in the prototype in accordance with the teachings of this disclosure as compared to a commercially available depth camera. The leftmost column of FIG. 7A depicts the reference objects. A column 702 corresponds to example output of the examples disclosed herein. A column 704 corresponds to example output of a commercially available depth camera.

The extent to which the prototype in accordance with the examples disclosed herein can perform well under bright ambient lighting conditions has been characterized. It may be difficult to make a direct comparison with a commercially available depth camera, which uses an infrared light source, therefore, a broadband halogen lamp that extends well into the region used by a sensor of the commercially available depth camera was selected. Next, disparity maps were captured under a set of illuminance values measured at the spherical test object. As shown in FIG. 7A, the commercially available depth camera disparity map breaks up under significantly dimmer lighting than the prototype in accordance with the teachings of this disclosure. The commercially available depth camera's performance cutoff has been demonstrated in natural lighting conditions. Furthermore, the illuminance of the laser pico-projector used, measured at the object, is around 150 lux. The disparity map of the prototype falters with an ambient flux an order of magnitude above that of the projector.

In this example, both methods captured with one second exposure at 128×128 resolution (the commercially available depth camera's output cropped to match) and median filtered are illustrated. An object is placed one meter (1 m) from the sensor under ~150 lux ambient illuminance measured at the object. Note that while the image-space resolution for both methods are matched, the examples disclosed herein produce higher depth resolution.

Figure 7B:
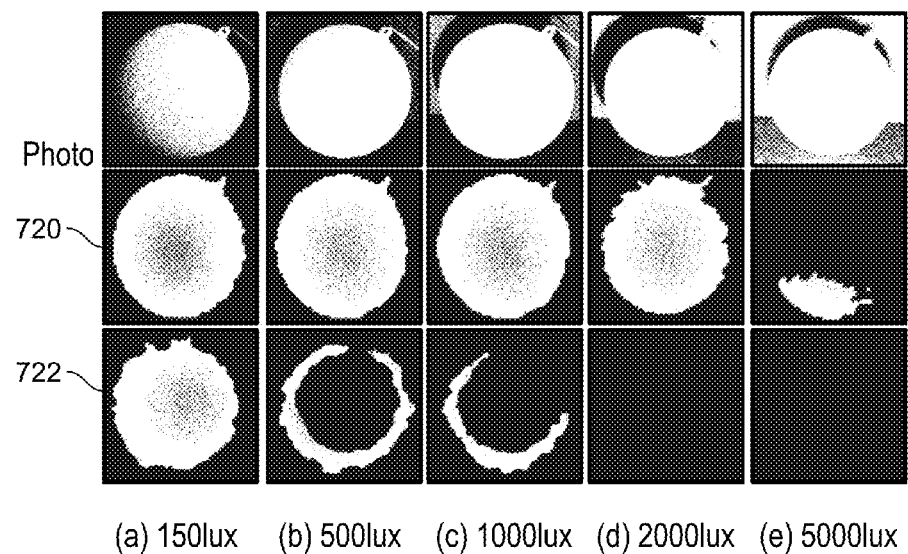

Turning to FIG. 7B, disparity output for both methods captured with one second exposure at 128×128 resolution (e.g., a commercially available depth camera's output cropped to match) under increasing illumination measured at the middle of the sphere surface is illustrated. The illuminance from the prototype projector pattern was measured at 150 lux. The top row indicates the actual reference photo. A row 720 corresponds to example output of the examples disclosed herein. A row 722 corresponds to example output of a commercially available depth camera. Note that in addition to outperforming the commercially available depth camera, the examples disclosed herein return usable data at ambient illuminance levels of an order of magnitude higher than the projector power.

Figure 7C:
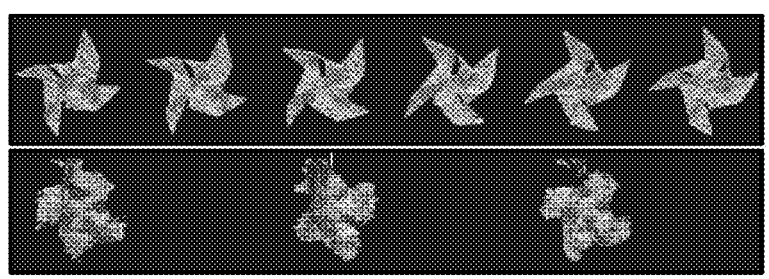

Turning to FIG. 7C, example output is shown as the top row depicts six frames of a pinwheel spinning at roughly 120 rpm, captured at 60 frames per second ("fps") using the examples disclosed. In contrast, the bottom row depicts the same pinwheel spinning at the same rate and over the same time interval captured with the commercially available depth camera. Only 3 frames are shown due to the 30 fps native frame rate of the commercially available depth camera.

Figure 8A:
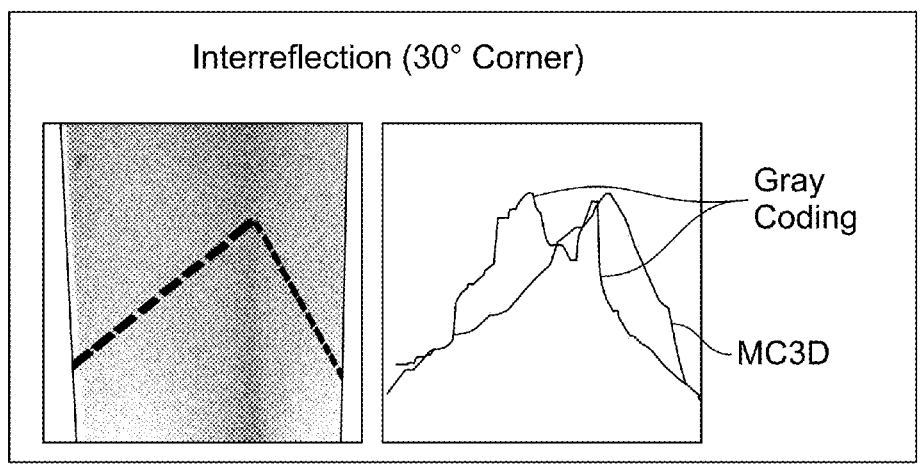
FIGS. 8A-8B show comparisons of scanning results with a known scanning technique.

FIG. 8A compares the examples disclosed herein to conventional gray coding in an inter-reflection scenario illustrated as a thirty degree corner, for example. As can be seen in FIG. 8A, the examples disclosed herein, which are designated as "MC3D," have a much more accurate reproduction of the general shape of the corner, whereas conventional gray coding may result in a significantly distorted shape and may have problems discerning an apex of the corner.

Figure 8B:
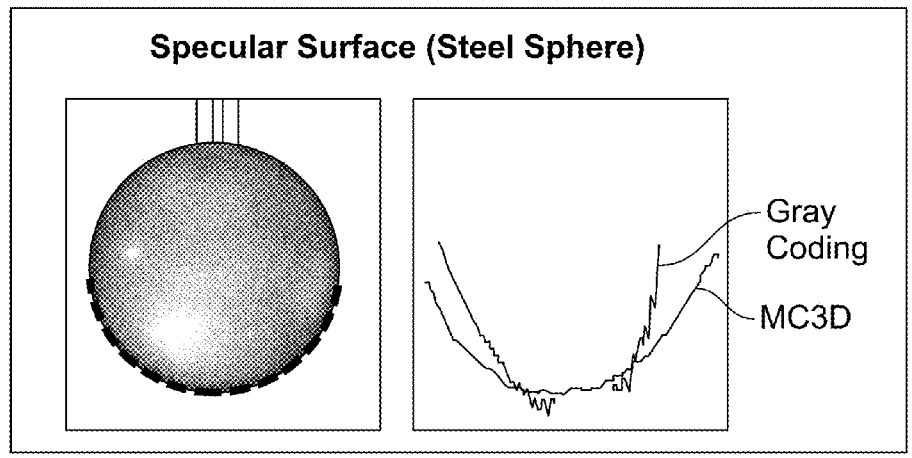

FIG. 8B compares the examples disclosed herein to conventional gray coding in a specular surface scenario depicted as a steel sphere. As can be seen in FIG. 8B, the examples disclosed herein, which are designated as "MC3D," have a much more accurate reproduction of the general shape of the sphere, whereas conventional gray coding greatly distorts the overall shape and seems to result in significant noise.

Figure 9:
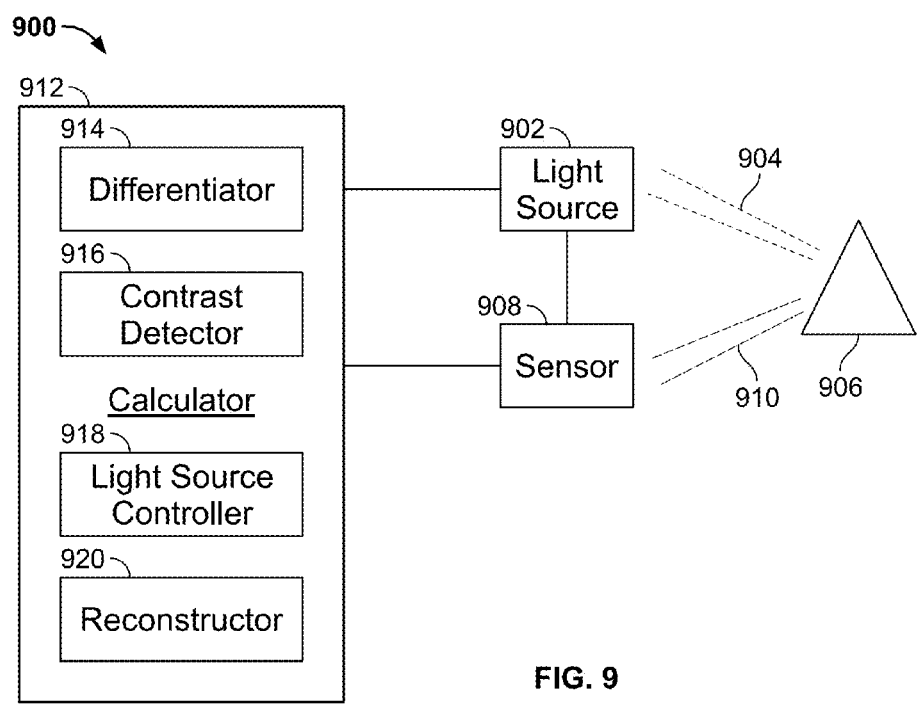
FIG. 9 is an example scanning apparatus in which the examples disclosed herein may be implemented.

FIG. 9 shows an example scanning apparatus 900 in which the examples disclosed herein may be implemented. In this example, the scanning apparatus 900 has a light source 902 applying light 904 to an object 906. In this example, a sensor (e.g., a temporal contrast sensor) 908 detects the reflected light 910 from the object 906. The sensor 908 of the illustrated example is a motion contrast camera that communicates changes in the reflected light to the calculator 912 when the changes exceed a threshold. The calculator 912 calculates a depth of the object 906 based on changes in brightness and includes a differentiator 914, a contrast detector 916, a light source controller 918, and a reconstructor 920.

In some examples, the sensor 908 may move in relation to the object 906 (e.g., move across the object 906) by, for example, a motorized device. In some examples, the scanning apparatus 900 may have multiple light sources and/or sensors to scan the object 906. In some examples, the calculator 912 and/or the sensor 908 may direct the light source along the object 906.

Figure 10:
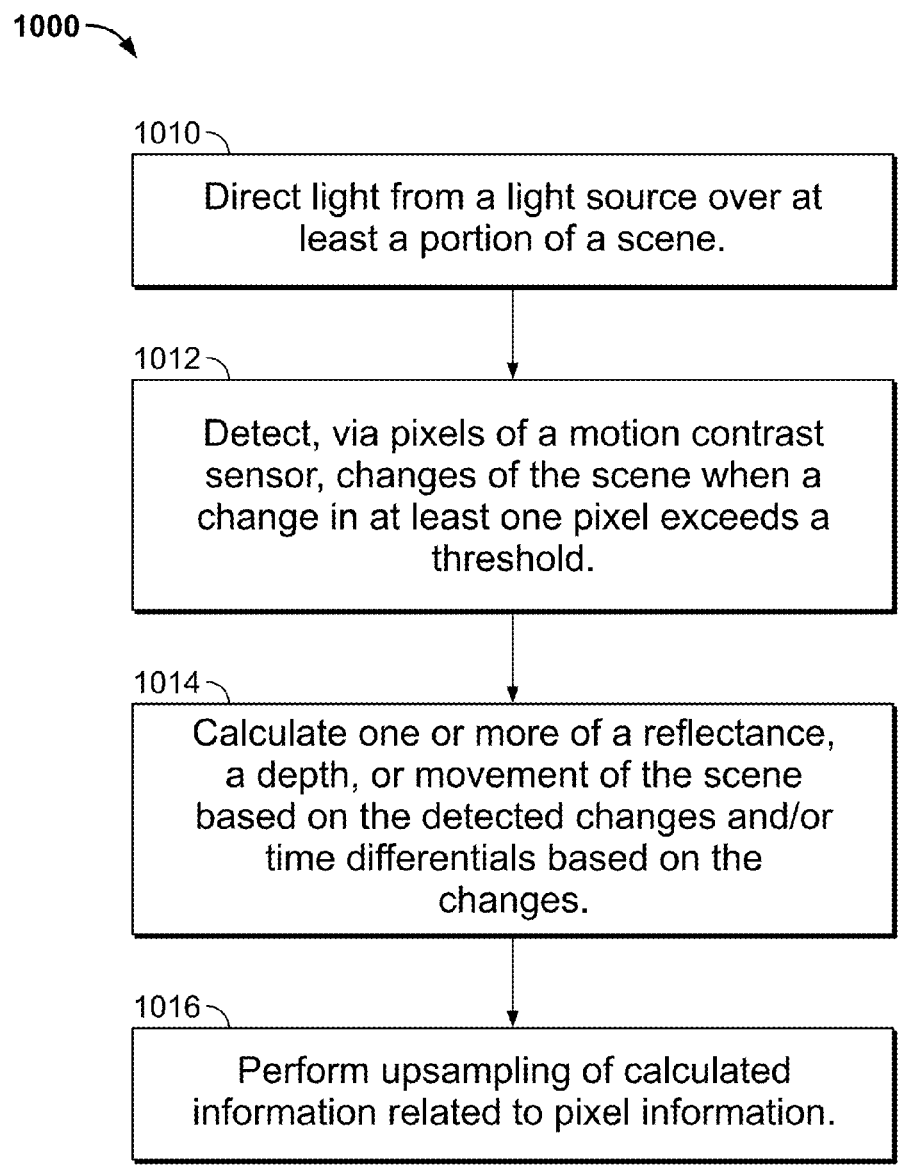
FIG. 10 is an example method to implement the example scanning apparatus of FIG. 9.
Figure 11:
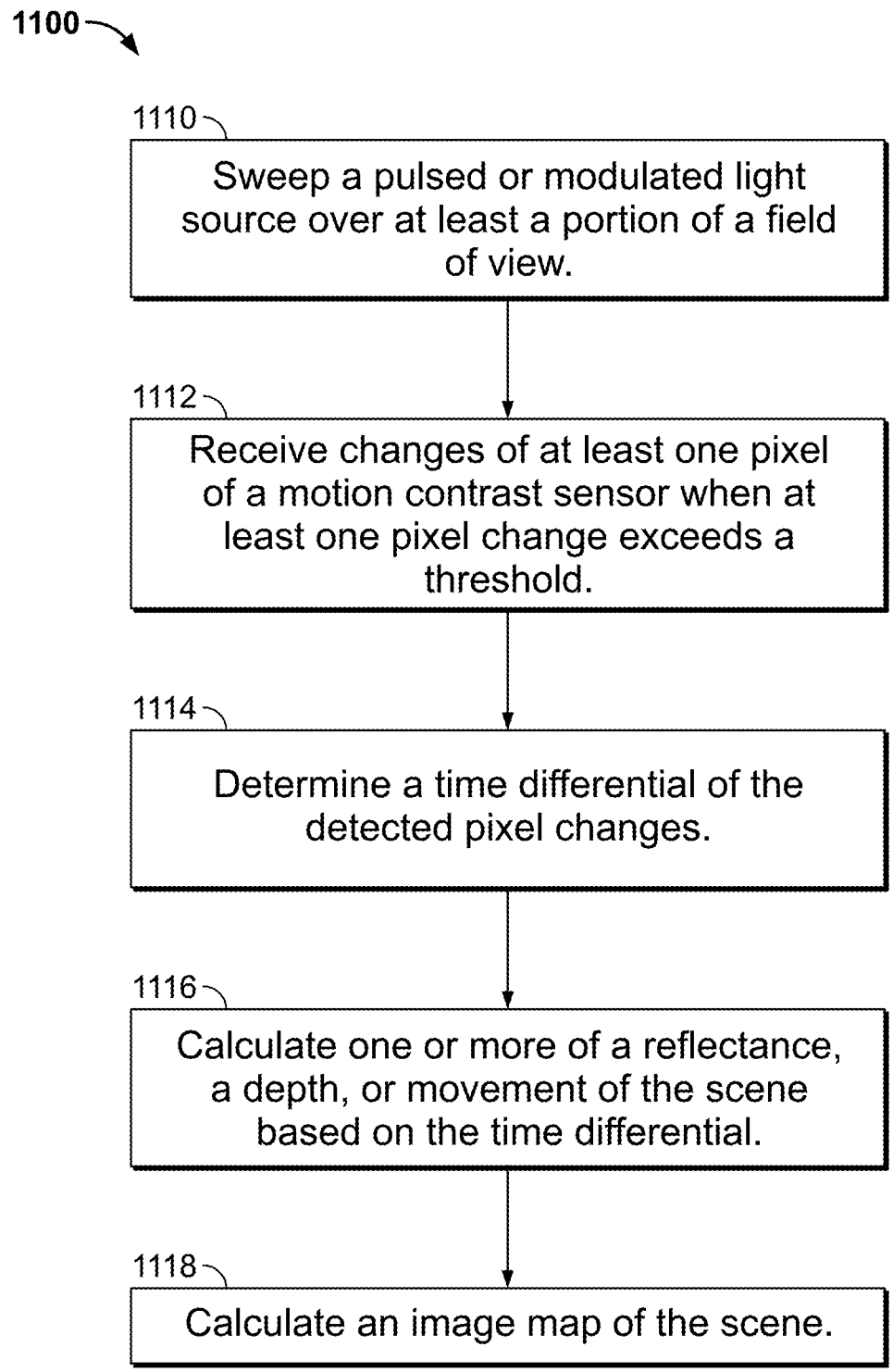
FIG. 11 is another example method to implement the example scanning apparatus of FIG. 9.

While an example manner of implementing the example scanning apparatus 900 of FIG. 9 is illustrated in FIGS. 10 and 11, one or more of the elements, processes and/or devices illustrated in FIGS. 10 and 11 may be combined, divided, re-arranged, omitted, eliminated and/or implemented in any other way. Further, the example the example light source 902, the example sensor 908, the example calculator 912, the example differentiator 914, the example contrast detector 916, the example light source controller 918, the example reconstructor 920 and/or, more generally, the example scanning apparatus 900 of FIG. 9 may be implemented by hardware, software, firmware and/or any combination of hardware, software and/or firmware. Thus, for example, any of the example light source 902, the example sensor 908, the example calculator 912, the example differentiator 914, the example contrast detector 916, the example light source controller 918, the example reconstructor 920 and/or, more generally, the example scanning apparatus 900 of FIG. 9 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example light source 902, the example sensor 908, and/or the example calculator 912, the example differentiator 914, the example contrast detector 916, the light source controller 918 and/or the example reconstructor 920 is/are hereby expressly defined to include a tangible computer readable storage device or storage disk such as a memory, a digital versatile disk (DVD), a compact disk (CD), a Blu-ray disk, etc. storing the software and/or firmware. Further still, the example scanning apparatus 900 of FIG. 9 may include one or more elements, processes and/or devices in addition to, or instead of, those illustrated in FIG. 9, and/or may include more than one of any or all of the illustrated elements, processes and devices.

Flowcharts representative of example machine readable instructions for implementing the scanning apparatus 900 of FIG. 9 are shown in FIGS. 10 and 11. In these examples, the machine readable instructions comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 10 and 11, many other methods of implementing the example scanning apparatus 900 may alternatively be used. For example, the order of execution of the blocks may be changed, and/or some of the blocks described may be changed, eliminated, or combined.

As mentioned above, the example processes of FIGS. 10 and 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 10 and 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 10 is an example method in which the examples disclosed herein may be implemented. The method of FIG. 10 begins at block 1010 where light (e.g., pulsed and/or modulated light, a modulated laser, a continuous wave, etc.) from a light source (e.g., the light source 902) is distributed over (e.g., swept over) at least a portion of a field of view corresponding to an object and/or scene (e.g., numerous objects) to be scanned (block 1010). In this example, a light source controller such as the light source controller 918 of FIG. 9 is used to control the light source movement and/or record the light source position and/or orientation with respect to time. In some examples, the object being scanned moves relative to the detector. In some examples, the sensor moves (e.g., is directed) across the object.

Next, changes in pixels (e.g., individual pixels) are detected at a motion contrast sensor (e.g., the sensor 908) as the light source is swept across the scene when a change in a pixel exceeds a threshold (block 1012). In this example, only changes in pixels that exceed the threshold are reported, thereby culling unnecessary data. In this example a contrast detector such as the contrast detector 916 of FIG. 9 is used for this determination. In this example, the pixel changes are quantified as time differentials and/or logarithmic time differentials by a differentiator such as the differentiator 914 of FIG. 9. Next, a calculator such as the calculator 912 of FIG. 9 and/or a reconstructor such as the reconstructor 920 is used to calculate one or more of a reflectance, a depth or movement of the scene based on the detected pixel changes and/or changes in brightness as time differentials (e.g., logarithmic time differentials) (block 1014). In some examples, the reconstructor may be used to reconstruct a depth map and/or imaging based on a time differential. In some examples, relationships such as those described Equations 4-10 described above may be used to make such a determination. In some examples, upsampling of the calculated information is performed to increase resolution of the data (block 1016).

FIG. 11 is another example method in which the examples disclosed herein may be implemented. The method of FIG. 11 begins at block 1110 where a light source (e.g., the light source 902) is swept over at least a portion of a field of view of an object or scene (e.g., a scene with numerous objects) to be scanned (block 1110). Changes in at least one pixel of a motion contrast sensor are received/detected when at least one pixel change exceeds a threshold (block 1112). Next, a time differential (e.g., a logarithmic time differential) is determined and/or calculated based on the detected pixel changes by a differentiator such as the differentiator 914 of FIG. 9 (block 1114).

Next, one or more of a reflectance, a depth or a movement of the scene is calculated based on the calculated time differential (block 1116). In some examples, an image map of the scene is generated in addition to a depth map reconstructed from the calculated time differential (block 1118). For example, the light source may be modulated and/or have a varying pattern to enable an intensity map such as the intensity map 612 of FIG. 6A and/or the intensity plots 632 of FIG. 6B to be generated. The intensity map may be used to define imaging of the scene (e.g., define varying reflectiveness of the scene). In some examples, the imaging may be correlated to the depth map to create a 3-D image. As mentioned above, filters and/or color lasers may be used to generate color imaging.

Figure 12:
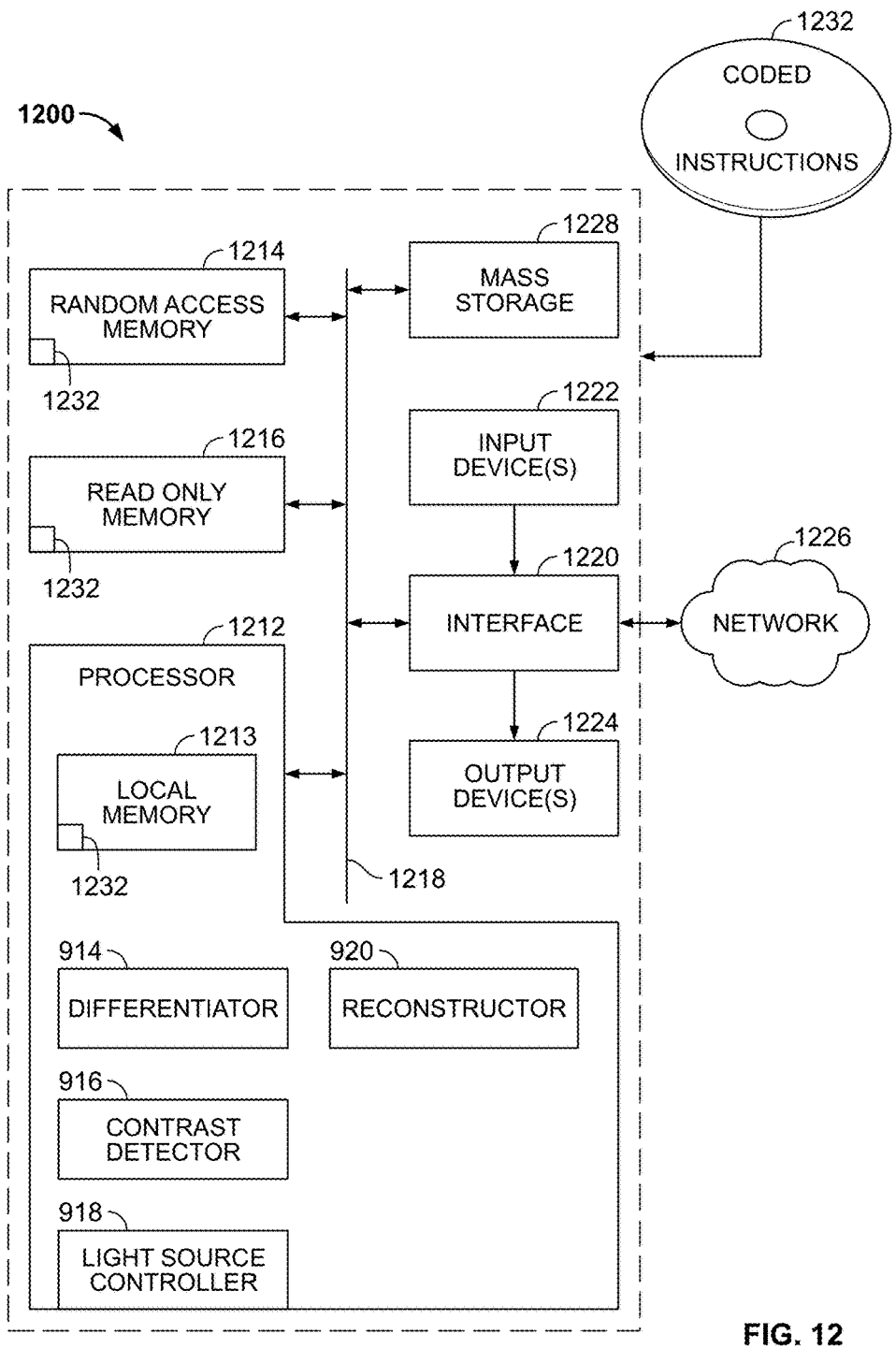
FIG. 12 is a block diagram of an example processor platform capable of executing machine readable instructions to implement the methods of FIGS. 10 and 11.

The example methods of FIGS. 11 and 12 may be used to capture three-dimensional objects with relatively low bandwidth requirements and/or entire three-dimensional scenes (e.g., numerous objects), which may even be present in outdoor ambient lighting, for example. In some examples, the low bandwidth requirements of the examples disclosed herein allow three-dimensional scans to be captured efficiently at different time steps (e.g., three-dimensional time-step captures, etc.).

FIG. 12 is a block diagram of an example processor platform that may be used to execute systems, methods and apparatus described herein. The processor platform 1200 of the instant example includes a processor 1212. For example, the processor 1212 can be implemented by one or more microprocessors or controllers from any desired family or manufacturer. The processor 1212 includes a local memory 1213 (e.g., a cache) and is in communication with a main memory including a volatile memory 1214 and a non-volatile memory 1216 via a bus 1218. In this example, the processor 1212 also includes the differentiator 914, the contrast detector 916, the light source controller 918, and the reconstructor 920. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 also includes an interface circuit 1220. The interface circuit 1220 may be implemented by any type of interface standard, such as an Ethernet interface, a universal serial bus (USB), and/or a PCI express interface.

One or more input devices 1222 are connected to the interface circuit 1220. The input device(s) 1222 permit a user to enter data and commands into the processor 1212. The input device(s) can be implemented by, for example, a keyboard, a mouse, a touchscreen, a track-pad, a trackball, isopoint and/or a voice recognition system.

One or more output devices 1224 are also connected to the interface circuit 1220. The output devices 1224 can be implemented, for example, by display devices (e.g., a liquid crystal display, a cathode ray tube display (CRT), etc.). The interface circuit 1220, thus, typically includes a graphics driver card.

The interface circuit 1220 also includes a communication device such as a modem or network interface card to facilitate exchange of data with external computers via a network 1226 (e.g., an Ethernet connection, a digital subscriber line (DSL), a telephone line, coaxial cable, a cellular telephone system, etc.).

The processor platform 1200 also includes one or more mass storage devices 1228 for storing software and data. Examples of such mass storage devices 1228 include floppy disk drives, hard drive disks, compact disk drives and digital versatile disk (DVD) drives. The mass storage device 1228 may implement a local storage device.

Coded instructions 1232 (e.g., coded instructions of FIG. 12) may be stored in the mass storage device 1228, in the volatile memory 1214, in the non-volatile memory 1216, and/or on a removable storage medium such as a CD, Blu-Ray, or DVD.

The examples disclosed herein allow a laser scanning approach to structured light recovery of 3D spatial information. Such examples utilize a motion contrast camera to lower (e.g., minimize) redundant sampling of irrelevant pixels, thereby significantly increasing (e.g., maximizing) the speed of the laser scanner. Such configurations retain light efficiency and resolution advantages of laser scanning while attaining the real-time performance of single-shot methods.

The examples disclosed herein demonstrate that a method can be implemented using existing components with a lower (e.g., minimal) amount of system integration. The results from the examples disclosed herein have been demonstrated to outperform highly engineered, mass produced commercial hardware in speed, accuracy, and light efficiency.

This patent claims priority to U.S. Provisional Application No. 62/004,456, filed on May 29, 2014, which is hereby incorporated by reference.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

We claim:

1. An apparatus comprising:
   an illumination source that is to provide at least one of spatial or temporal changes to light emitted from the illumination source to a scene;
   a motion contrast sensor, wherein pixels of the motion contrast sensor detect changes corresponding to the scene, the motion contrast sensor to determine a time differential of intensity of at least one pixel change and to report the time differential when the time differential exceeds a threshold; and
   a processor to calculate at least one of a reflectance, a depth, or movement of the scene based on the reported time differentials.

2. The apparatus as defined in claim 1, wherein the threshold is adjusted based on lighting conditions of the scene.

3. The apparatus as defined in claim 1, further including a re-director to direct the light over different points of the scene.

4. The apparatus as defined in claim 3, wherein the re-director comprises a movable lens.

5. The apparatus as defined in claim 1, wherein the illumination source is controlled with respect to a system clock.

6. The apparatus as defined in claim 1, wherein the illumination source includes at least one of a laser raster scanner, a laser scanner, a projector, a translating mask with a light source, or a translated diffraction grating with a laser light source.

7. The apparatus as defined in claim 1, wherein the processor determines one or more of a depth map or an intensity map of the scene.

8. The apparatus as defined in claim 1, wherein the processor uses a known illumination pattern or motion contrast observation to determine at least one of the reflectance, depth, or movement of the scene.

9. The apparatus as defined in claim 1, further comprising a plurality of motion contrast sensors.

10. The apparatus as defined in claim 1, further comprising a plurality of illumination sources.

11. A method comprising:
    directing a light source over a portion of a scene;
    detecting, via pixels of a motion contrast sensor, changes of the scene when a change in at least one pixel exceeds a threshold;
    measuring intensity of a pixel as a function of time;
    determining a time differential of the intensity of the pixel as a function of time; and
    calculating, using a processor, one or more of a reflectance, a depth or movement of the scene based on the time differential;
    wherein the light source is controlled with respect to a system clock.

12. The method as defined in claim 11, further including temporally varying the light source over at least of the portion of the scene.

13. The method as defined in claim 11, wherein the time differential includes a logarithmic time differential.

14. The method as defined in claim 11, further including upsampling calculated data by the processor.

15. The method as defined in claim 11, further including imaging the scene by defining a recovered intensity.

16. The method as defined in claim 11, wherein the directing step comprises directing a plurality of light sources over a portion of a scene.

17. The method as defined in claim 11, wherein the detecting step comprises detecting, via pixels of a plurality of motion contrast sensors, changes of the scene when a change in at least one pixel exceeds a threshold.

18. A tangible, non-transitory machine readable medium comprising instructions stored thereon, which when executed, cause a processor of a machine to:
    cause an illumination source to distribute light over a field of view of a scene;
    receive data from a motion contrast sensor, the data related to pixel changes that exceed a threshold and that result from changes in the scene;
    calculate a time differential for each pixel change; and
    calculate a depth of the scene based on time differentials related to the data received from the motion contrast sensor.

19. The tangible, non-transitory machine readable medium as defined in claim 18, wherein the illumination source is distributed over the field of view via a temporal change in the illumination source.

20. The tangible, non-transitory machine readable medium as defined in claim 18, wherein the illumination source includes a projector to re-direct light over different portions of the field of view.

21. The tangible, non-transitory machine readable medium as defined in claim 18, wherein the instructions cause the processor to upsample the data received from the motion contrast sensor.

22. The tangible, non-transitory machine readable medium as defined in claim 18, wherein the instructions cause the processor to adjust the threshold.

23. The tangible, non-transitory machine readable medium as defined in claim 18, wherein the instructions cause the processor to determine an image of the scene.

* * * * *